United States Patent
Goodsitt et al.

(10) Patent No.: US 11,411,937 B2
(45) Date of Patent: Aug. 9, 2022

(54) WEB SCRAPING PREVENTION SYSTEM

(71) Applicant: Capital One Services, LLC, McLean, VA (US)

(72) Inventors: Jeremy Goodsitt, Champaign, IL (US); Reza Farivar, Champaign, IL (US); Austin Walters, Savoy, IL (US); Vincent Pham, Champaign, IL (US); Anh Truong, Champaign, IL (US); Galen Rafferty, Mahomet, IL (US); Mark Watson, Urbana, IL (US)

(73) Assignee: Capital One Services, LLC, McLean, VA (US)

( * ) Notice: Subject to any disclaimer, the term of this patent is extended or adjusted under 35 U.S.C. 154(b) by 214 days.

(21) Appl. No.: 16/919,717

(22) Filed: Jul. 2, 2020

(65) Prior Publication Data
US 2022/0006790 A1 Jan. 6, 2022

(51) Int. Cl.
*H04L 9/40* (2022.01)
*H04L 67/568* (2022.01)
*G06F 40/143* (2020.01)
*G06F 40/154* (2020.01)
*H04L 67/02* (2022.01)

(52) U.S. Cl.
CPC ........ *H04L 63/0428* (2013.01); *G06F 40/143* (2020.01); *G06F 40/154* (2020.01); *H04L 67/02* (2013.01); *H04L 67/2842* (2013.01)

(58) Field of Classification Search
CPC .................................................. G06F 40/143
See application file for complete search history.

(56) References Cited

U.S. PATENT DOCUMENTS

2017/0126719 A1* 5/2017 Mason .................. G06F 40/154
2019/0228047 A1 7/2019 Bougon

OTHER PUBLICATIONS

<https://stackoverflow.com/questions/3161548/how-do-i-prevent-site-scraping>; "How do I prevent site scraping?"; retrievied Jul. 2, 2020; 28 pages.

* cited by examiner

*Primary Examiner* — Esther B. Henderson
(74) *Attorney, Agent, or Firm* — Walter Haverfield LLP; James J. Pingor

(57) ABSTRACT

Randomizations of a web page may be generated in advance and provided to a client. The client may store the randomizations in its cache. Multiple randomizations for the same web page may be provided to the client and may be stored in the client's cache. When a request for a web page is made, it is determined if the client has any cached randomizations. Randomizations for the probable next web page to be requested by the client may be provided to the client for storage in the cache. For example, the probability that a link will be clicked or a web site visited may be determined. Those web pages and web sites with higher probabilities may be determined. Randomizations for those web pages are then provided to the client for use.

17 Claims, 4 Drawing Sheets

WEB SCRAPING PREVENTION SYSTEM

BACKGROUND

1. Technical Field

The present disclosure relates to systems and methods to prevent unauthorized data gathering from websites, and in particular to systems and methods to randomize the content or structure of web pages.

2. Introduction

Automated collection of data from websites, known as web scraping, screen scraping, web data mining, web harvesting, web data extraction, etc. is commonplace. Robot scrapers gather data from websites and may post the content on other competing sites, sell or otherwise misuse the data. Such robot scrapers tie up network resources and impose costs on website owners.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Embodiments of the invention provide a system for randomizing a web page, the system comprising: one or more processors; and memory storing instructions that, when executed, cause the one or more processors to: receive web page components for the web page; generate a plurality of randomized web pages for the web page by randomizing the web page components to change a structure of the web page; store the plurality of randomized web pages in a buffer; receive a request for the web page from a computing device, the request including a number of randomized web pages for the web page that are stored in a cache of the computing device and a time randomized web pages were stored in the cache; determine, based on the number of the randomized web pages stored in the cache of the computing device and the time, to send additional randomized web pages for the web page from the buffer to the computing device; retrieve the randomized web pages from the buffer; send the additional randomized web pages to the computing device in response to the request; determine a next web page to be requested from the computing device based on the requested web page and a usage pattern; provide a plurality of randomized web pages for the next web page from the buffer to the computing device for storage in the cache; track the number of times respective randomized web pages in the buffer have been sent to a computing device; delete the respective randomized web pages from the buffer when the number of times exceeds a predetermined threshold; automatically generate new randomized web pages to replace the deleted randomized web pages; and store the new randomized web pages in the buffer.

Embodiments of the invention provide a system for randomizing a web page, the system comprising: one or more processors; and memory storing instructions that, when executed, cause the one or more processors to: send a request for a web page from a client, the request including a number of randomized web pages for the web page that are stored in a cache of the client and a time the randomized web pages were stored in the cache; receive a plurality of randomized web pages for the web page at the client, the randomized web pages being generated by randomizing the web page components to change a structure of the web page; store the plurality of randomized web pages in the cache of the client; select one of the randomized web pages in the cache to display the web page resulting in a selected randomized web page; track a number of times the randomized web pages in the cache are used to display the web page; delete randomized web pages from the cache when the number of times exceeds a predetermined threshold; automatically request a replacement for the deleted randomized web pages; and store replacement randomized web pages in the cache.

Embodiments of the invention provide a computer-implemented method, comprising: generating a plurality of randomized web pages for a web page by randomizing web page components to change a structure of the web page; generating an identifier for each of the plurality of randomized web pages; encrypting each of the plurality of randomized web pages resulting in encrypted randomized web pages; storing the plurality of encrypted randomized web pages in a buffer; sending the plurality of encrypted randomized web pages to a computing device for caching; providing a table, the table associating the identifier of the plurality of randomized web pages with the computing device and the encryption key; receiving a request for the web page from a computing device, the request including the identifier for one of the encrypted randomized web pages stored in the cache of the computing device; retrieving a decryption key associated with the identifier and the computing device; sending the decryption key to the computing device; tracking a number of times the encryption key for the randomized web page is sent; deleting the encrypted randomized web page from the buffer when the number of times exceeds a predetermined threshold; automatically providing new randomized web pages to replace deleted randomized web pages; and encrypting and storing the new randomized web pages in the buffer.

Disclosed are systems, methods, and non-transitory computer-readable storage media a technical solution to the technical problem described.

DETAILED DESCRIPTION

Figure 1:
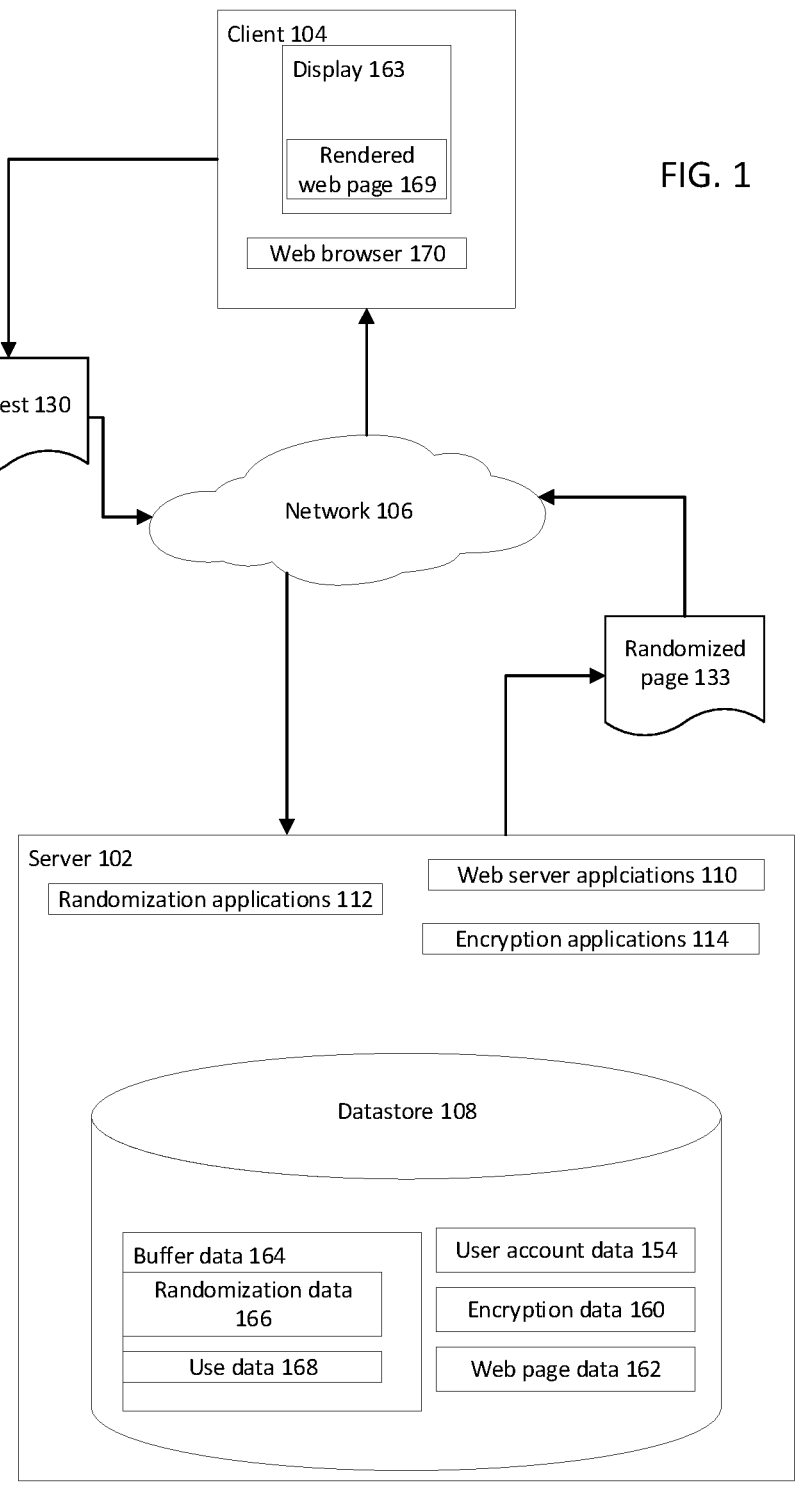
FIG. 1 illustrates an example system embodiment.

Various embodiments of the disclosure are described in detail below. While specific implementations are described, it should be understood that this is done for illustration purposes only. Other components and configurations may be used without parting from the spirit and scope of the disclosure.

The present disclosure is directed to methods, systems, and non-transitory computer-readable media to randomize a web page. The web page is defined by different structural components, such as cascading style sheet, HTML, JavaScript, class, id, etc. Every compilation of the web page components may be randomized to prevent scraping. The randomization should be done so that the web page appears the same visually. In some examples, it is the static content on the web page that is randomized. The randomization of web page components may be done in a variety of ways. The web page may be re-ordered. For example, the placement of tags and variables may be changed. The order of HTML elements may change as long as any required dependencies are maintained. The structure of the web page code may be randomized, code may be replaced with different code that performs the same function. Meaningless code may be added to a function, so the code looks and acts differently, making it difficult for a scraper to understand.

The randomized web pages may be generated in advance or dynamically when a web page is requested. In one example implementation, one or more randomizations of a web page may be generated in advance and provided to a client. The client may store the randomizations in its cache. Multiple randomizations for the same web page may be provided to the client and may be stored in the client's cache. When a request for a web page is made, it is determined if the client has any cached randomizations. It may also be determined if those cached randomizations are available for use. In some circumstances the use of the randomizations may be limited. For example, randomizations may expire after a predetermined period of time, number of uses, etc. Determining if a randomization is available for use may be performed by the client, a server responding to the request, or a combination to the two.

If no randomizations for the web page are in the client cache, or if the cached randomizations have expired, new randomizations are provided to the client. The randomizations may be generated dynamically or retrieved from a buffer of randomizations. One or more randomizations may be proved to the client. Use of only one of those randomizations may be permitted for the current request. Permission may be provided via encryption, password, or other content protection techniques. The client may then render the web page.

If the client has available cached randomizations, one of those randomizations is selected and used to render the web page. The selection of the randomization to use may itself be random. The client may then render the web page using the selected randomization.

Using the cache to store the randomizations increases the speed and efficient of rendering of the requested web page. To further improve computer functionality, randomizations for the probable next web page to be requested by the client may be provided to the client for storage in the cache. For example, the probability that a link will be clicked or a web site visited may be determined. Those web pages and web sites with higher probabilities, for example over a threshold probability, may be determined. Randomizations for those web pages are then provided to the client for use as described above. The probability may be determined on usage patterns for the web page being requested, for the domain in general, for client, for the user, etc., and combination of the same.

In addition, the randomization may be done per web page requested, not just for a domain. Each change of web page (click) may provide a new randomization. This can allow for randomization of an entire website.

Additional examples and variations are provided in the figures, and these variations shall be described herein as the various embodiments are set forth. FIG. 1 illustrates an example networked environment 100 according to various embodiments. The networked environment 100 includes one or more servers 102 in data communication with one or more computing devices, such as clients 104, by way of a network 106. The network 106 includes, for example, the Internet, intranets, extranets, wide area networks (WANs), local area networks (LANs), wired networks, wireless networks, or other suitable networks, etc., or any combination of two or more such networks.

The server 102 may comprise, for example, a server computer or any other system providing computing capability. Alternatively, a number of servers 102 may be arranged, for example, in one or more server banks or computer banks or other arrangements. For example, a plurality of servers 102 together may comprise a cloud computing resource, a grid computing resource, and/or any other distributed computing arrangement. Server 102 may be located in a single installation or may be distributed among many different geographical locations.

Various applications and/or other functionality may be executed in the server 102 according to various embodiments. Also, various data is stored in a datastore 108. The datastore 108 is accessible to the server 102. The datastore 108 may be representative of a plurality of datastores 108. The data stored in the datastore 108, for example, is associated with the operation of the various applications and/or functional entities described below.

The components executed on the server 102, for example, include one or more web server applications 110, randomization applications 112, encryption applications 114 and other applications, services, processes, systems, engines, or functionality not discussed in detail herein.

The data stored in the datastore 108 includes, for example, user account data 154, encryption data 160, web page data 162, and buffer data 164, including randomization data 166 and use data 168.

Web page data 162 may correspond to a web page, mobile application page, or any other form of network content. For example, a web page data 162 may include hypertext markup language (HTML), extensible markup language (XML), cascading style sheets (CSS), extensible style sheet language transformations (XSLT), JavaScript, VBScript, images, animations, videos, audio, and other data. A web page has a document structure, which, when rendered by the client 104 for display, has a particular visual appearance. The document structure may correspond to a document object model (DOM) having a plurality of elements.

Randomization applications 112 may execute to randomize the structure of a web page. Web page data 162 may be operated on by randomizations applications 112 to randomize the components of a web page. A template may be used to create the randomization. The randomization may be any of the randomizations described above. The randomizations may also include transforming an HTML element into another HTML element, adding elements to the web page structure that to not affect the visual display of the web page, changing identifier names or class attribute names, etc. A plurality of randomizations may be generated for each web page.

Randomization may be done in a multitude of ways depending on the specific implementation, as will be appreciated. In an example of randomization of variables, the variables are identified (variables within a function, function names, class names). Those variables that are renamable or include anything renamable (package/file names) are identified. Those variables that are renamable may be replaced with a valid randomized alphanumeric replacement. In this context, valid means that the code will still compile with the replacement.

Another example of randomization is to change the flow of code within a function. The code is analyzed to identify potential ways in which the code can be re-ordered. This may be done manually or automatically. The potential re-orderings may be stored in datastore 108 for later use. When a randomization is requested, one of the re-orderings is selected and used to randomize the order of the code. The selection may be done in a random order, first-in, first out, last-in, first out, etc. The randomization may be done by randomly moving blocks of code and validating unit tests, or moving code up until the next point in the code when those variables are next mentioned. For instance, if multiple variables are declared at the top of a function, the order of the declarations may be randomized if the functions are not dependent on each other. Additionally, irrelevant code and functions, etc. that do not impact the code or results may be randomly added to the code. The changes to the code should be validated to ensure they have no impact with unit tests provided with the code.

In some embodiments encryption applications 114 execute to encrypt the randomizations. The encryption may be done in a known manner using encryption/decryption key pairs. Each randomization may have a different encryption/decryption key. In some embodiments, the encryption key may be unique to the client or user. Encryption data 160 may include identifiers for randomized web pages associated with the encryption/decryption key, for example stored as a database record in datastore 108. The encryption data 160 may be accessed to determine the decryption key to use to decrypt an encrypted randomization.

Randomizations may be stored in buffer data 164. Buffer data 164 may store a pool of randomizations. Randomization may be swapped in and out of the buffer data 164 based on time limits, use limits, etc. The buffer data 164 may associate an identifier with the randomization. The identifier may specify to which web page the randomization corresponds. Multiple randomizations for one web page may be grouped or stored together so that multiple randomizations for the same web page may be quickly retrieved and provided to a client. The creation time, number of times the randomization has be provide to a client, and other usage information may be associated with the identifier.

User account data 154 includes data relating to user accounts with the web site. The user account data 154 may include data that facilitates authentication of clients 106 by way of username, password, security token, public key encryption, etc. The user account data 154 may also include data that indicates privileges and/or restrictions relating to access to account information and web site content. User account data 154 may also include the randomizations provided to a client 104, and the associated decryption key. This information may also be stored in a table associating the client identifier, provided web pages and respective decryption keys.

In some embodiments user account data 154 may include metrics regarding the client's site and web page usage. Usage patterns may be evaluated based on the metrics. Data regarding what web page the user came from, what web page they are currently visiting, and the subsequent web page accessed or link clicked may be tracked. User account data 154 may include also information regarding cookies. The usage patterns may be anonymized, and may be general usage patterns for the domain or web site. Probabilities of the next link clicked or web page to be requested may be determined based on the user account data, such as the usage pattern. Machine learning and artificial intelligence may be used to learn the usage pattern. The probabilities may be stored as part of the user account data and may be generated dynamically.

Web server applications 110 execute to serve the randomized web pages to the client in response to a request. Web server application 110 may also serve randomizations for the predicted web pages. Web server applications 110 may execute to determine those web sites or links most likely to be clicked. Web server applications 110 may use information from cookies and user account data to determine the probabilities. Web ser application retrieve the randomizations from randomization data 166 and provide the randomizations to the client via network. The probability determination may also be performed by a separate application(s) or as part of another of the described applications.

Client 104 is representative of a plurality of client devices that may be coupled to the network 106. The client 104 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 104 may include a display 163. The display 163 may comprise, for example, one or more devices such as cathode ray tubes (CRTs), liquid crystal display (LCD) screens, gas plasma-based flat panel displays, LCD projectors, or other types of display devices, etc.

A user may gain access to server 102 by using client 104 programmed with a web browser 170 or other software, to locate and select (such as by clicking with a mouse) a particular webpage. The content of the webpage is located in the one or more web page data 162 and randomization data 166. The web browser 170 may be programmed to access and render web pages 127 or other content served by the server 102 to render web page 169 on the display 163. The client 104 may be configured to execute applications beyond the web browser 170 such as, for example, mobile applications, email applications, instant message applications, and/or other applications.

A request 130 for a web page is issued by a client 104 and sent to the server 102 via the network 106. The user or client 104 making the request may be authenticated by the server 102 in a known manner. The authentication process may utilize the datastore 108 in the user account data in datastore 108. In some embodiments authentication is not required.

The request 130 is provided to the web server application 110. The request 130 may include various information, for example, the web page being requested, cache size, cache space available, page identifiers and associated randomizations stored in cache, and other information as can be appreciated. A cookie may be used for this purpose. The web server application 110 determines what information should be provided to the client 104 in response to the request 130, gathers that information, and provides that information to the client 104. For example, the web server application 110 may examine user account data 154 and/or a cookie for the client 104 to determine if the client 104 has cached randomizations of the requested web page stored in its cache, and if so, how many. If the number of randomizations is below a threshold, additional randomizations for the requested web page may be provided to the client 104. The number of randomizations provided may depend on a number of factors, such as the size of the cache, the size of each page, etc. For example, if the page is very large, the threshold may be lower so that the cache is not filled by a single page. The same randomizations may be provided to different clients.

Also, randomizations based on a prediction of the next web page(s) to be requested may be sent to the client 104. As discussed above, usage patterns and other information are analyzed to what additional randomizations to provide to the client 104 based on probabilities. Randomizations for those pages or paths with a probability higher than a predetermined threshold may be proved to the client 104. The number of randomizations may also be impacted by the size of cache available. For example, it may be desired that the cached randomizations do not occupy more than 50% of the available cache. This threshold may vary based on the specific implementation and use requirements, as can be appreciated.

In one example, a Markov model may be utilized for predictions. Based on the current page, the probability that the user browses to a next page available is determined. Statistics such as these are trackable, and are in fact tracked by many websites. Models of user behavior can be generated from the statistics in a known manner. The models and predictions may be based on general user workflows or individual user workflows.

In some embodiments, randomization may be subject to use limits, for example, used for a certain period of time, a number of times for a client 104, a number of times in total, or other use limits. The use limits may be tracked and controlled, for example, by the web server applications 110 and stored in use data 168. The web server applications 110 may track these and other related parameters and update the data in the randomization data 166 or use data 168 accordingly. When use thresholds are met, the randomization may be deleted from the buffer data 164. A notification may be sent to the randomization applications 112 that new randomization for that web page are required. The randomization may generate new randomizations and provide them to the buffer data 164. Alternatively, the randomization may already be created, and are moved to the buffer data 164 for use. In addition, the server 102 may instruct the client 104 to delete randomization from the cache when the usage threshold is met.

In embodiments where the randomizations are encrypted, the web server application 110 determines if the client 104 is requesting a decryption key for a randomization stored at the cache of the client 104. The request 130 generated by the client 104 may include at identification of the client 104, an identifier for the web page(s) being requested (web page name, page ID, etc.), and a request for the key.

Figure 2:
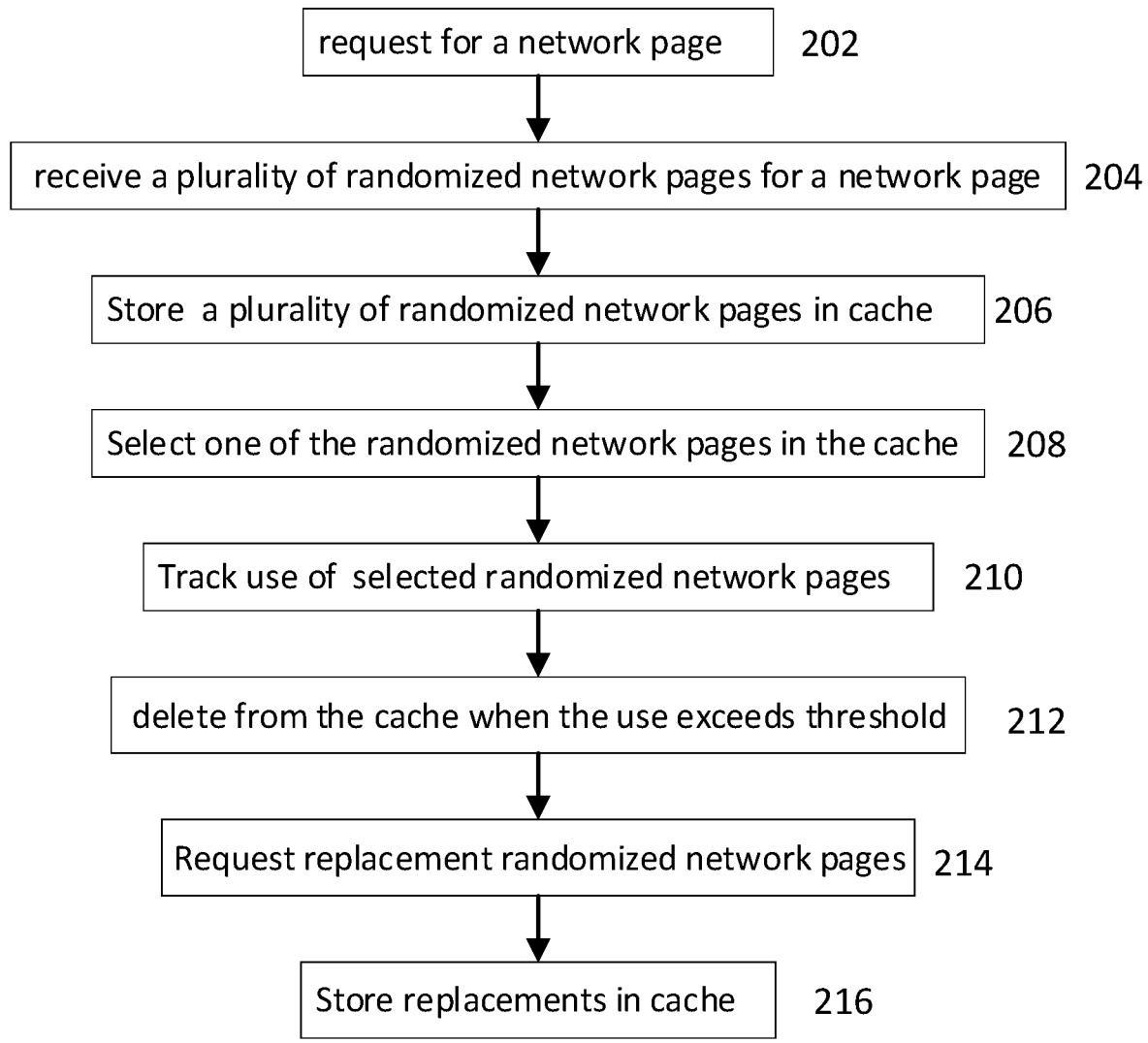
FIG. 2 illustrates an example method embodiment.

Referring next to FIG. 2, a flowchart showing an example method according to an embodiment of the invention is illustrated. FIG. 2 provides one example of the many functional arrangements that may implement the various applications described above. The various steps may be re-ordered or omitted for a particular implementation. In box 202, client 104 issues a request for a web page. The request may include a number of randomized web pages for the web page that are already stored in a cache of the client 104. The time the randomized web pages were received and stored in the cache may also be included in the request. As described above, the request may include other information. In embodiments where the randomizations are encrypted, the request may be a request for a decryption key for the web page. Once the decryption key for a randomization is received, the randomization in the cache may be used without the need for a request, subject to any use limits.

Per box 204, a plurality of randomized web pages 133 for a web page are received at the client 104. The randomized web pages may be generated by randomizing the web page components to change a structure of the web page. The plurality of randomized web pages are stored in the cache of the client 104 in box 206. Note that the order of boxes 202 and 204 are not required to be performed in a specific order. These process may also be performed in a different order, that is, the request for the web page may be issued at different times.

In order to render the web page, one of the randomized web pages in the cache is selected per box 208. The web browser executes to display the web page, resulting in a selected randomized web page. In box 210 a number of times the selected randomized web page is used to display the web page may be tracked. For example, the client 104 may update data associated with the selected randomized web page. Randomized web pages are deleted from the cache when the number of times exceeds a predetermined threshold, box 212. Other data regarding the randomizations may also be monitored by the client 104. For example, the client 104 may check a time requirement for the randomization and delete the randomization from the cache when a specified time period has elapsed. The client 104 may also receive instructions from the server 102 to remove or no longer use randomizations.

Per box 214-216, replacements for the deleted randomized web pages may be automatically requested and then stored in the cache once received.

Figure 3:
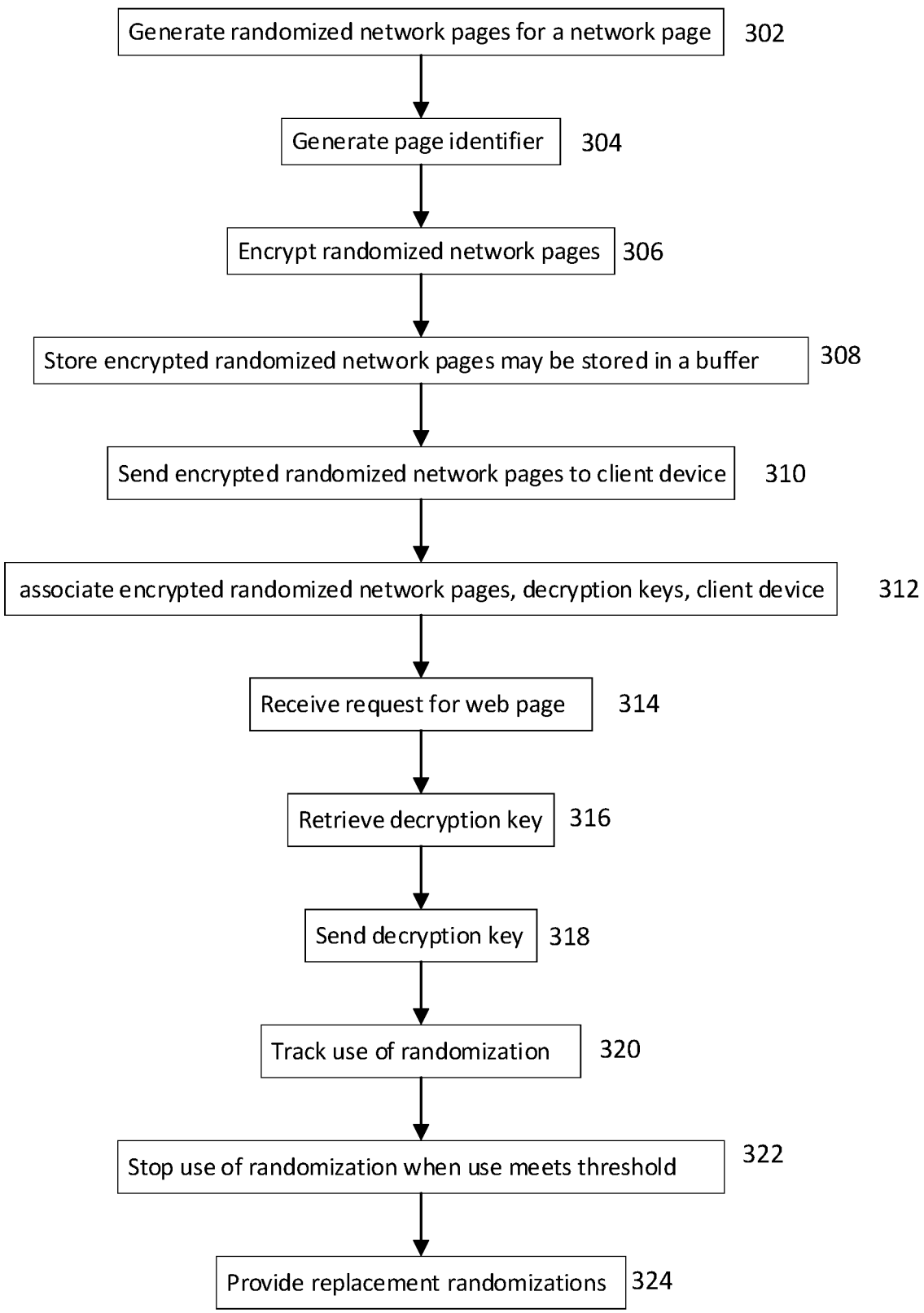
FIG. 3 illustrates an third example method embodiment.
Figure 4:
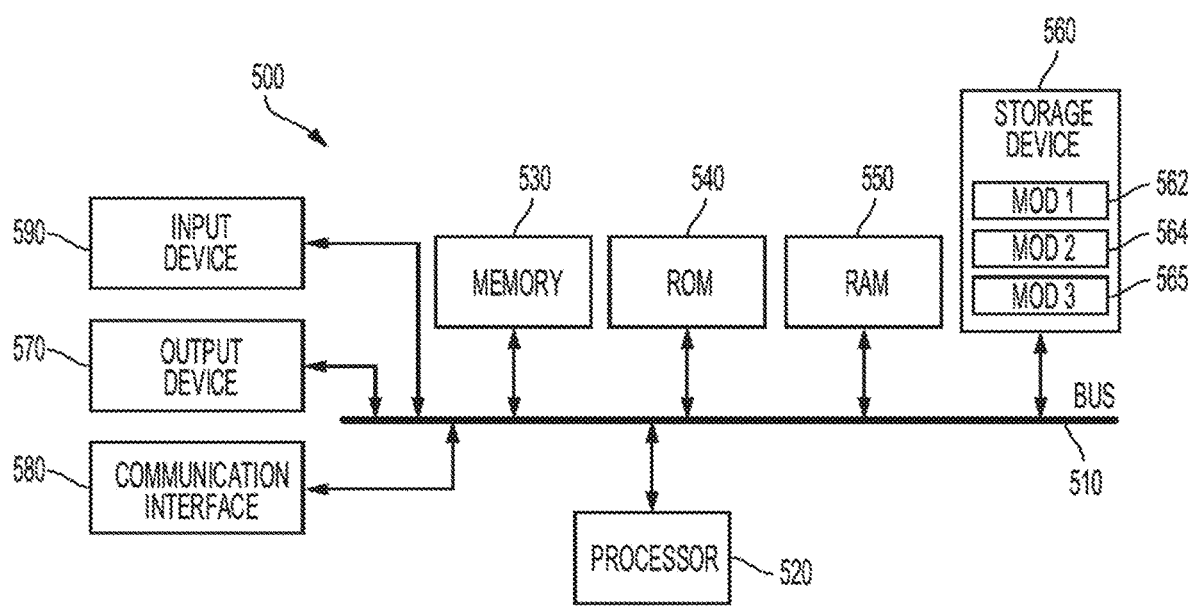
FIG. 4 illustrates an example computer system.

Referring next to FIG. 3, a flowchart showing another example method according to an embodiment of the invention is illustrated. FIG. 3 provides one example of the many functional arrangements that may implement the various applications described above. The various steps may be re-ordered or omitted for a particular implementation. At box 302, a plurality of randomized web pages for a web page are generated by randomizing web page components of the web page, for example stored in web page data 162 store 108. The randomization is applied to change a structure, for example the document structure, of the web page. An identifier is generated for each of the plurality of randomized web pages at box 304. The identifier may be the same as or different from the identifier for the original web page. The identifier may or may not be apparent from the identifier for the original web page. In some embodiments each of the plurality of randomized web pages are encrypted per box 306, resulting in encrypted randomized web pages. The plurality of encrypted randomized web pages may be stored in a buffer data 164, box 308. At box 310 the plurality of encrypted randomized web pages are sent to a client 104 for caching. In some cases, the encrypted randomized web pages may be generated dynamically upon the request and directly provided to the client 104.

The identifier of the plurality of randomized web pages provided to the client 104 are associated with the client 104 and the decryption key, for example, by storing the information in a table, box 312. The table may store pointers to where the information is stored. For example, for security reasons, the table may store a pointer to where the decryption key is stored. A request for the web page from a client 104, box 314. The request may include, among other information, the identifier for one of the encrypted randomized web pages stored in the cache of the client 104. The decryption key associated with the identifier and the client 104 is retrieved, for example from the table of clients, identifiers, and decryption keys, box 316. The decryption key is sent to the client 104, box 318. Per box 320, a number of times the decryption key for the randomized web page is sent to the client 104, or to any client, is tracked. The encrypted randomized web page is no longer sent to client 104, for example, by deleting the randomization from the buffer data 164, removing the randomization from a rotation of randomizations for at least a period of time, when the number of times exceeds a predetermined threshold, box 322. Instructions may also be sent to the client 104 to remove the randomization for the cache or to no longer use the randomization. In box 324 new randomized web pages are provided to replace deleted randomized web pages. The new randomized web pages may be encrypted and stored in the buffer data 164.

With reference to FIG. 5, an exemplary system includes a general-purpose computing device 500, including a processing unit (CPU or processor) 520 and a system bus 510 that couples various system components including the system memory 530 such as read-only memory (ROM) 540 and random-access memory (RAM) 550 to the processor 520. The system 500 can include a cache of high-speed memory connected directly with, in close proximity to, or integrated as part of the processor 520. The system 500 copies data from the memory 530 and/or the storage device 560 to the cache for quick access by the processor 520. In this way, the cache provides a performance boost that avoids processor 520 delays while waiting for data. These and other modules can control or be configured to control the processor 520 to perform various actions. Other system memory 530 may be available for use as well. The memory 530 can include multiple different types of memory with different performance characteristics. It can be appreciated that the disclosure may operate on a computing device 500 with more than one processor 520 or on a group or cluster of computing devices networked together to provide greater processing capability. The processor 520 can include any general-purpose processor and a hardware module or software module, such as module 1 562, module 2 564, and module 3 566 stored in storage device 560, configured to control the processor 520 as well as a special-purpose processor where software instructions are incorporated into the actual processor design. The processor 520 may essentially be a completely self-contained computing system, containing multiple cores or processors, a bus, memory controller, cache, etc. A multi-core processor may be symmetric or asymmetric.

The system bus 510 may be any of several types of bus structures including a memory bus or memory controller, a peripheral bus, and a local bus using any of a variety of bus architectures. A basic input/output (BIOS) stored in ROM 540 or the like, may provide the basic routine that helps to transfer information between elements within the computing device 500, such as during start-up. The computing device 500 further includes storage devices 560 such as a hard disk drive, a magnetic disk drive, an optical disk drive, tape drive or the like. The storage device 560 can include software modules 562, 564, 566 for controlling the processor 520. Other hardware or software modules are contemplated. The storage device 560 is connected to the system bus 510 by a drive interface. The drives and the associated computer-readable storage media provide nonvolatile storage of computer-readable instructions, data structures, program modules and other data for the computing device 500. In one aspect, a hardware module that performs a particular function includes the software component stored in a tangible computer-readable storage medium in connection with the necessary hardware components, such as the processor 520, bus 510, display 570, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 500 is a small, handheld computing device, a desktop computer, or a computer server.

Although the exemplary embodiment described herein employs the hard disk 560, other types of computer-readable media which can store data that are accessible by a computer, such as magnetic cassettes, flash memory cards, digital versatile disks, cartridges, random access memories (RAMs) 550, and read-only memory (ROM) 540, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 500, an input device 590 represents any number of input mechanisms, such as a microphone for speech, a touch-sensitive screen for gesture or graphical input, keyboard, mouse, motion input, speech and so forth. An output device 570 can also be one or more of a number of output mechanisms known to those of skill in the art. In some instances, multimodal systems enable a user to provide multiple types of input to communicate with the computing device 500. The communications interface 580 generally governs and manages the user input and system output. There is no restriction on operating on any particular hardware arrangement and therefore the basic features here may easily be substituted for improved hardware or firmware arrangements as they are developed.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

The invention claimed is:

1. A system for randomizing a web page, the system comprising:
   one or more processors; and
   memory storing instructions that, when executed, cause the one or more processors to:
   receive web page components for the web page;
   generate a plurality of randomized web pages for the web page by randomizing the web page components to change a structure of the web page;
   store the plurality of randomized web pages in a buffer;
   receive a request for the web page from a computing device, the request including a number of randomized web pages for the web page that are stored in a cache of the computing device and a time randomized web pages were stored in the cache;
   determine, based on the number of the randomized web pages stored in the cache of the computing device and the time, to send additional randomized web pages for the web page from the buffer to the computing device;
retrieve the randomized web pages from the buffer;
send the additional randomized web pages to the computing device in response to the request;
determine a next web page to be requested from the computing device based on the web page and a usage pattern;
provide a plurality of randomized web pages for the next web page from the buffer to the computing device for storage in the cache;
track the number of times respective randomized web pages in the buffer have been sent to a computing device;
delete the respective randomized web pages from the buffer when the number of times exceeds a predetermined threshold;
automatically generate new randomized web pages to replace deleted randomized web pages; and
store the new randomized web pages in the buffer.

2. The system of claim 1, wherein the instructions further cause the one or more processors to encrypt each of the randomized web pages with a unique encryption key.

3. The system of claim 2, wherein the request for the web page includes a request for a decryption key corresponding to the encryption key.

4. The system of claim 1, wherein the instructions further cause the one or more processors to determining a number of randomized web pages to send to the computing device based on a size of the cache and a probability of a web page being requested.

5. The system of claim 1, wherein the instructions further cause the one or more processors to send randomizations for that web page to the computing device for caching when the probability is higher than a probability threshold.

6. The system of claim 1, wherein the web page components are defined based on a cascading style sheet, HTML, and JavaScript.

7. The system of claim 6, wherein the instructions further cause the one or more processors to randomize the cascading style sheet, HTML, and JavaScript to change the structure of the web page.

8. The system of claim 1, wherein the usage pattern is a general usage pattern for the web page.

9. The system of claim 1, wherein the usage pattern is a user specific usage pattern based on the web page and a prior page that the user navigated from to the web page.

10. A computer-implemented method, comprising:
generating a plurality of randomized web pages for a web page by randomizing web page components to change a structure of the web page;
generating an identifier for each of the plurality of randomized web pages;
encrypting each of the plurality of randomized web pages resulting in encrypted randomized web pages;
storing the encrypted randomized web pages in a buffer;
sending the encrypted randomized web pages to a computing device for caching;
providing a table, the table associating the identifier of the plurality of randomized web pages with the computing device and the encryption key;
receiving a request for the web page from a computing device, the request including the identifier for one of the encrypted randomized web pages stored in the cache of the computing device;
retrieving a decryption key associated with the identifier and the computing device;
sending the decryption key to the computing device;
tracking a number of times the encryption key for the randomized web page is sent;
deleting the encrypted randomized web page from the buffer when the number of times exceeds a predetermined threshold;
automatically providing new randomized web pages to replace deleted randomized web pages; and
encrypting and storing the new randomized web pages in the buffer.

11. The computer-implemented method of claim 10, further comprising:
determining a probability of a next web page to be requested from the computing device based on the web page and a usage pattern; and
providing a plurality of encrypted randomized web pages for the next web page to the computing device for storage in the cache.

12. The computer-implemented method of claim 10, wherein the encryption key is unique to each encrypted randomized web page.

13. The computer-implemented method of claim 10, wherein the encryption key is unique to the computing device.

14. A system for randomizing a web page, the system comprising:
one or more processors; and
memory storing instructions that, when executed, cause the one or more processors to:
send a request for a web page from a client, the request including a number of randomized web pages for the web page that are stored in a cache of the client and a time the randomized web pages were stored in the cache;
receive a plurality of randomized web pages for the web page at the client, the randomized web pages being generated by randomizing the web page components to change a structure of the web page;
store the plurality of randomized web pages in the cache of the client;
select one of the randomized web pages in the cache to display the web page resulting in a selected randomized web page;
track a number of times the randomized web pages in the cache are used to display the web page;
delete randomized web pages from the cache when the number of times exceeds a predetermined threshold;
automatically request a replacement for the deleted randomized web pages; and
store replacement randomized web pages in the cache.

15. The system of claim 14, wherein the instructions further cause the one or more processors to request a decryption key for the selected randomized web page in the cache.

16. The system of claim 15, wherein the instructions further cause the one or more processors to:
receive the decryption key, the decryption key being associated with the client and the selected randomized web page in the cache.

17. The system of claim 14, wherein the instructions further cause the one or more processors to select one of the randomized web pages in the cache randomly.

* * * * *